Feb. 21, 1956     E. STAUDER     2,735,459
CIRCULAR SAW BLADE FOR CUTTING WOOD WHICH CONTAINS NAILS
Filed April 28, 1953
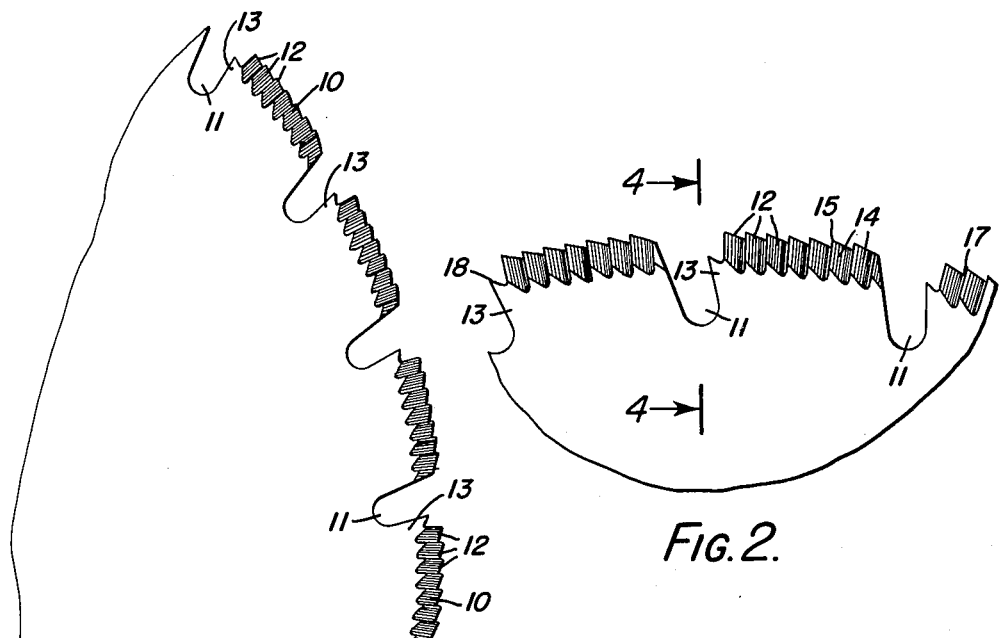
FIG. 1.
FIG. 2.
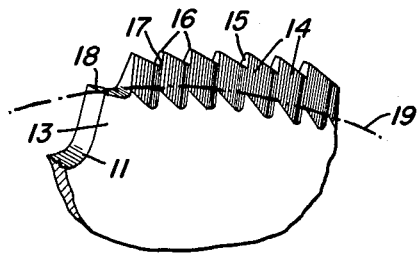
FIG. 3.
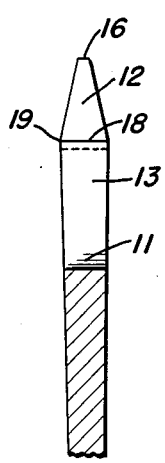
FIG. 4.
INVENTOR.
EMANUEL STAUDER
BY
*Edward H. Cumpston*
HIS ATTORNEY

United States Patent Office 2,735,459
Patented Feb. 21, 1956

2,735,459

CIRCULAR SAW BLADE FOR CUTTING WOOD WHICH CONTAINS NAILS

Emanuel Stauder, Irondequoit, N. Y., assignor to Huther Brothers Saw Manufacturing Company, Rochester, N. Y., a corporation of New York Application April 28, 1953, Serial No. 351,587

3 Claims. (Cl. 143—133)

This invention relates to circular saw blades of the variety having peripheral toothed sections spaced circumferentially of the blade and each provided with a multiplicity of cutting teeth, with intermediate raker teeth and gullets for receiving the chips. One object of the invention is to provide an improved blade of the above character adapted for cutting both wood and metal.

Another object, more specifically stated, is to provide such a blade adapted for rapidly cutting the nails securing the cover of a wooden box, at the joint between the cover and box, so that the cover may be easily removed without the necessity for pulling out the nails or breaking up the cover or box.

Another object, therefore, is to provide a blade of the indicated nature adapted for cutting away the wood and nails in the joint between the cover and box, with raker teeth and gullets for clearing away the chips, the nails being cut by teeth adapted for that purpose and the raker teeth being so disposed as to avoid contact with the nails.

Another object is to provide such a blade adapted for cutting the nails and for operation at the higher speed commonly employed for wood saws.

To these and other ends the invention resides in certain improvements and combinations of parts, all as will be hereinafter more fully described, the novel features being pointed out in the claims at the end of the specification.

In the drawings:

Fig. 1 is a side elevation of a saw blade embodying the present invention;

Fig. 2 is a fragmentary, enlarged side elevation of parts of the blade periphery shown in Fig. 1;

Fig. 3 is a fragmentary, enlarged, perspective view further illustrating the peripheral portions of the blade, and Fig. 4 is an enlarged, sectional view on the line 4—4 in Fig. 2.

The conventional wood saw has commonly been made with cutting teeth beveled and offset on alternate sides for obtaining clearance and with the raker teeth only slightly lower than the beveled cutting teeth. Such a saw does not operate satisfactorily for the purposes of the present invention, either to cut metal or for clearing away the wood cuttings since the raker teeth would encounter the nails and be quickly dulled.

I have found that a saw blade may be constructed to rapidly cut both nails and wood so that it can be advantageously employed for cutting along the joint between the cover and body of a wooden box, to first cut the nails securing the cover, by pointed cutting teeth adapted for that purpose and at the same time clearing away the wood by broad-edged raker teeth without contact of the latter with the nails.

Referring more particularly to the drawings, my improved circular saw blade is formed with a series of peripheral toothed sections 10 (Fig. 1) spaced circumferentially of the blade as shown, the blade being cut away between the sections to form chip-receiving gullets 11. Each section is formed with a series of cutting teeth 12 and also with a raker tooth 13 in advance of the cutting teeth and between the latter and the adjacent gullet 11.

Metal cutting teeth commonly have full width cutting edges but each of the cutting teeth 12 of my saw is beveled on both sides, towards the center plane of the blade as at 14 (Figs. 2 and 3), to form a cutting point 15, with the points of these cutting teeth lying in a common plane midway between and parallel with the side faces of the blade, as shown. These points 15 are substantially sharp in character and adapted for cutting metal nails, although, if so desired, they may have at the points slight lands, as shown at 16 (Fig. 4). These oppositely beveled teeth are also relieved inwardly from the leading edges 15 to the trailing edges 17 thereof, as shown, for clearance.

The raker teeth 13 have sharp leading edges 18 extending broadly or in full width from one face to the other of the blade, for effectively clearing the slot cut in the wood at the joint between the box and cover and these leading edges 18 are preferably located at a radial distance from the center of the blade not greater than the radius of the base line 19 of the cutting teeth, or, say, about ⅛ of an inch below the points 15 of the nail cutting teeth. Each raker blade has one of the gullets 11 located in advance of it, as shown, to receive the cuttings made by the teeth.

The blade is preferably hollow ground inwardly from the base line of the cutting teeth so as to relieve the pressure on the blade as it moves through the slot cut by the teeth, as indicated in Fig. 4. The nail cutting teeth 12 are preferably flame-hardened, as well understood in the art.

In operation, the blade is fed along the joint between a box and its cover so as to cut into the joint, with the oppositely beveled, sharp, hardened teeth 12 cutting away the wood and cutting away and parting the nails so as to leave one portion of each nail in the cover and another portion in the box. These teeth rapidly cut away the nails with their beveled side edges operating on the nail portions like coarse files. This "friction" cutting action is followed by the action of the raker teeth which clear away the cuttings from the slot but have their leading edges located at or below the base line of the metal cutting teeth, so that the nails are cut away in advance and prevented from dulling contact with the raker teeth.

A saw blade constructed as described may be rotated at the higher speeds commonly employed for wood cutting saws, say, 3600 R. P. M., and have been found successful in operation for quickly cutting loose and separating a nailed cover from its box, thus eliminating the laborious and time-consuming pulling of the nails, or the breaking up of the cover or box. The saw parts are of such construction and relative location as to maintain the sharpness and cutting efficiency of the teeth over substantial periods of use. My one-piece blade may be readily manufactured at relatively low cost by ordinary tools and operations and is convenient and economical in use.

It will thus be seen that the invention accomplishes its objects and, while it has been herein disclosed by reference to the details of a preferred embodiment, it is to be understood that such disclosure is intended in an illustrative rather than a limiting sense, as it is contemplated that various modifications in the construction and arrangement of the parts will readily occur to those skilled in the art, within the spirit of the invention and the scope of the appended claims.

I claim:

1. A one-piece wood and metal cutting saw comprising a circular blade having peripheral toothed sections spaced circumferentially of said blade and raker teeth located between adjacent sections, said blade being cut away in advance of said raker teeth to form chip-receiving gullets, each of said sections being formed with a series of cutting teeth with the sides of each cutting tooth bevelled inwardly towards the center plane of said blade to form a cutting point with said points lying in a common plane, and said raker teeth having sharp leading edges extending from one face to the other of said blade at a radial distance from the center thereof not greater than the base line of said cutting teeth.

2. A one-piece wood and metal cutting saw comprising a circular blade having a series of circumferentially spaced, peripheral toothed sections and raker teeth intermediate adjacent sections, said blade being cut away in advance of said raker teeth to form chip-receiving gullets, said sections being formed with a series of sharp cutting teeth each bevelled on opposite sides inwardly towards the center plane of said blade to a cutting point and relieved inwardly from its leading to its trailing end and each of said raker teeth having a sharp leading edge extending from face to face of said blade at a distance from the center thereof not greater than the distance therefrom of the base line of said cutting teeth.

3. A one-piece wood and metal cutting saw comprising a circular blade having a series of circumferentially spaced, peripheral toothed sections each formed with a series of cutting teeth with each of said cutting teeth bevelled on both opposite sides thereof inwardly towards the center plane of said blade to a cutting point and relieved inwardly from the leading to the trailing end thereof, raker teeth intermediate adjacent sections each having a sharp leading edge extending from side to side of said blade at a distance from the center thereof not greater than the base line of said cutting teeth, said blade being notched in advance of said raker teeth to form chip-receiving gullets and said blade being hollow-ground inwardly of the base line of said cutting teeth.

References Cited in the file of this patent

UNITED STATES PATENTS

| 8,393 | Woolston | Sept. 30, 1851 |
| 543,608 | Beale | July 30, 1895 |
| 1,630,945 | Jacobowitz | May 31, 1927 |